Feb. 12, 1963 J. V. GIANUKOS 3,077,258
MULTIPLE ROPE SIDE FRAME CONVEYOR
Filed Jan. 5, 1960 2 Sheets-Sheet 1

INVENTOR.
James V. Gianukos,
BY Parker & Carter
Attorneys.

Feb. 12, 1963  J. V. GIANUKOS  3,077,258
MULTIPLE ROPE SIDE FRAME CONVEYOR
Filed Jan. 5, 1960  2 Sheets-Sheet 2

INVENTOR.
James V. Gianukos,
BY Parker & Carter
Attorneys.

United States Patent Office 3,077,258
Patented Feb. 12, 1963

3,077,258
MULTIPLE ROPE SIDE FRAME CONVEYOR
James V. Gianukos, Chicago, Ill., assignor to Goodman Manufacturing Company, Chicago, Ill., a corporation of Illinois
Filed Jan. 5, 1960, Ser. No. 576
9 Claims. (Cl. 198—192)

This invention relates generally to rope sideframe conveyors, and particularly to such a conveyor utilizing multiple pairs of ropes for the side frames.

Rope sideframe conveyors have come into increasingly widespread use in recent years due to their many inherent desirable characteristics. Among these are high carrying capacity, low cost, ease of installation and maintenance, and ready adaptability to almost any conveyor environment.

These conveyors generally comprise a pair of flexible strands or sideframes, such as wire ropes, trained along a conveying course, such as a mine run. The ropes are supported at spaced intervals by suitable means such as ground support stands or roof hangers. A plurality of troughing idler assemblies are suspended from the ropes at intervals to form a bed for the conveying reach of a flexible conveyor belt. The troughing idler assemblies generally comprise a plurality of interconnected rollers which may be fixed or free to flex vertically, horizontally, or both vertically and horizontally with respect to one another. In some installations, the interconnected rollers are suspended directly from the rope sideframes whereas in others, a frame assembly carrying the rollers is suspended from the strands.

A plurality of return roller assemblies, which may be hung from the rope sideframes or carried by other supporting structure, are spaced at intervals directly beneath the troughing idler assemblies to form a bed for the return reach of the conveyor belt. The makeup of the return roller assemblies varies widely, but a convenient structure consists of an elongated roller journaled in brackets fixed to the support stands. Since the return reach of the belt carries no load, the return roller assemblies are usually spaced at substantially greater distances than the conveying reach.

Many structural variations of troughing idler assemblies have been evolved to meet specific needs in specific industries. While it is practically impossible to accurately classify the variant structures, for purposes of further description they may be divided into two broad categories; namely, flexible assemblies and cradled assemblies.

One of the simplest types of flexible assemblies consists merely of three rollers connected for flexure in a vertical plane with respect to one another. The outer ends of the wing or flanking rollers are connected directly to the rope sideframes. As a load approaches, the rollers flex with respect to one another to form a gradually deepening trough which optimizes the carrying capacity of the conveyor belt. This type of idler assembly has a very large carrying capacity because of this high degree of flexibility which in effect lets the belt curl around the load. For installations having ample head room, this type of roller assembly is widely used. The supporting structure for the rope sideframes is so dimensioned so as to maintain adequate vertical clearance between the bottom of the roller assembly and the top of the return reach of the conveyor belt when the rollers assume their deepest troughing contour.

The bodily generally downward displacement of the idler assembly is actually the result of a plurality of additive displacement effects. Because of the play in the rope sideframes between adjacent supporting structures, the ropes move downwardly and inwardly under the influence of load. The downward component of movement is of course due to the mass of the conveyed material, but the inward movement is due primarily to the shortening of the distance between the outer ends of the flanking rollers. The shortening effect results from the troughing movement of the rollers with respect to one another.

The cradled idler assembly is a second broad type of troughing idler assembly. The rollers in this construction are carried in a frame structure which in turn is connected directly to the rope sideframes. The frame structure may include members spanning all or a portion of the width of the conveyor and may be rigid or semi-rigid. The individual rollers are generally restrained from flexure vertically with respect to one another which results in a lessening of its inherent carrying capacity. This disadvantage however is often offset by the fact that since the troughing contour is maintained relatively uniform, the bodily downward displacement of the entire assembly may be less than that of an equally loaded fully flexible idler assembly. This feature is of particular advantage in low clearance installations such as coal mines where height is always a problem.

Because these conveyors were developed for use in a wide variety of conveyor environments, they embody certain compromises of construction. For example, the full flexing feature which is a desideratum in so many conveyor environments is not always the most ideal construction for low clearance operations. Because of the high carrying capacity resulting from the troughing or curling of the belt around the load, there is a considerable downward sag of the conveying reach, and, if the sag should become extreme under a very heavy load, there is a possibility that the conveying reach will interfere with the return reach. In low clearance operations, such as low seam coal mining, it is therefore often desirable to flatten out the troughing contour somewhat. This flattening of the troughing contour is generally accomplished either by increasing the tension in the rope sideframes or by placing the roller assembly in a substantially rigid cradle which fixes the troughing angle.

Another feature common to conventional two rope conveyors is the fact that relatively large tensions are needed to anchor the strands. Since only two rope sideframes are utilized, a relatively solid foundation is required. In soft ground, this may present considerable anchoring difficulties.

Accordingly, a primary object of this invention is to provide a rope sideframe conveyor having a plurality of ropes which greatly increases the operating efficiency of the conveyor for particular applications in many respects.

Another object is to provide a multiple rope sideframe conveyor in which the downward deflection of the troughing roller assembly is considerably less than in conventional two-rope sideframe conveyors to thereby permit the conveyor to be used in low clearance operations.

Another object is to provide a multiple rope sideframe conveyor in which the troughing characteristics of the roller assembly can be varied by varying the tensions in the rope sideframes.

Yet another object is to provide a rope sideframe conveyor in which the tension in each of the rope sideframes is considerably less than in many conventional rope sideframe conveyors to thereby facilitate installation and replacement of troughing roller assemblies.

A further object is to provide a rope sideframe conveyor in which the troughing roller assemblies are elevated above the ropes to thereby provide easy maintenance of the assemblies.

Yet a further object is to provide a rope sideframe conveyor having troughing roller assemblies elevated above the strands which retains the large carrying capacity of present conveyors utilizing fully flexible troughing roller assemblies.

A further object is to provide a rope sideframe conveyor which takes shock loads considerably better than prior art conveyors consisting of only two rope sideframes.

A further object is to provide a rope sideframe conveyor suitable for carrying very heavy loads which can be anchored in soft ground and which therefore requires considerably lighter ropes than that used in present conveyors.

A further object is to provide a rope sideframe conveyor which utilizes smaller and lighter rope sideframe supporting structures, thus reducing the cost and increasing the ease of installation and replacement of the supporting structures.

Other objects and advantages will become apparent upon reading the following description of the invention. The invention is illustrated more or less diagrammatically in the accompanying drawings, wherein.

Like reference numerals will be used to refer to like parts throughout the following description of the drawings.

Figure 1:
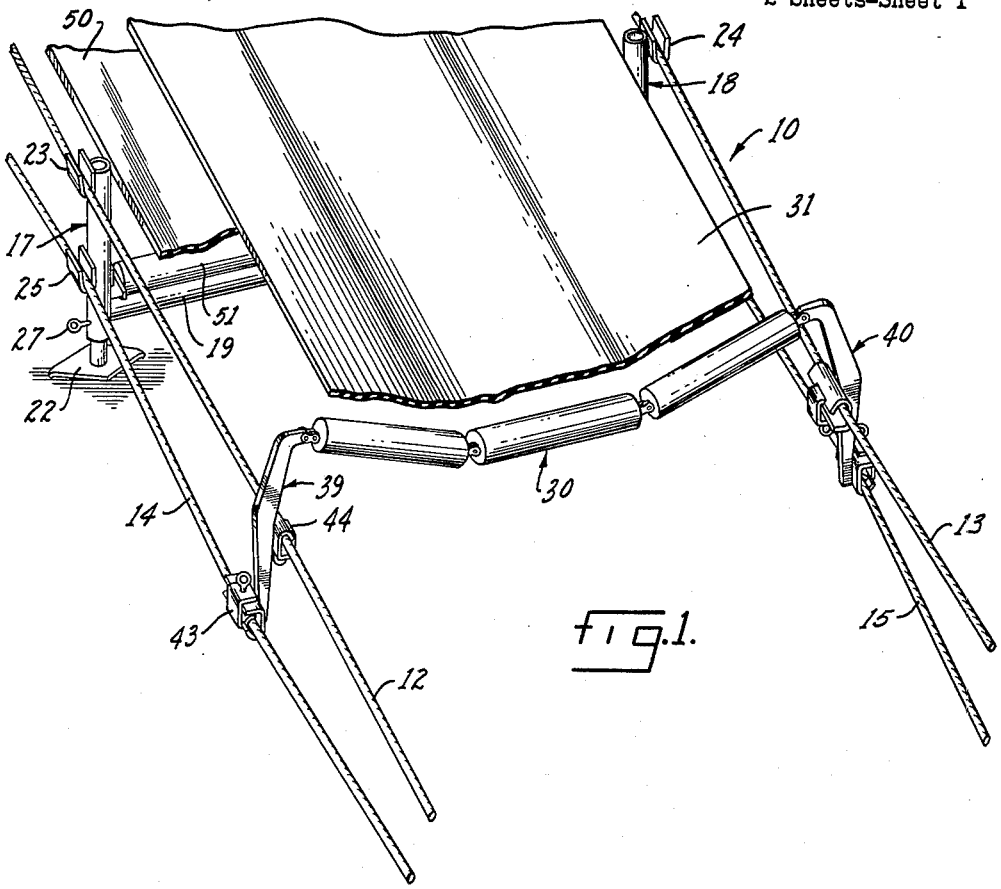
FIGURE 1 is a perspective view of a portion of a multiple rope sideframe conveyor with portions of the conveyor belt broken away for clarity.
Figure 2:
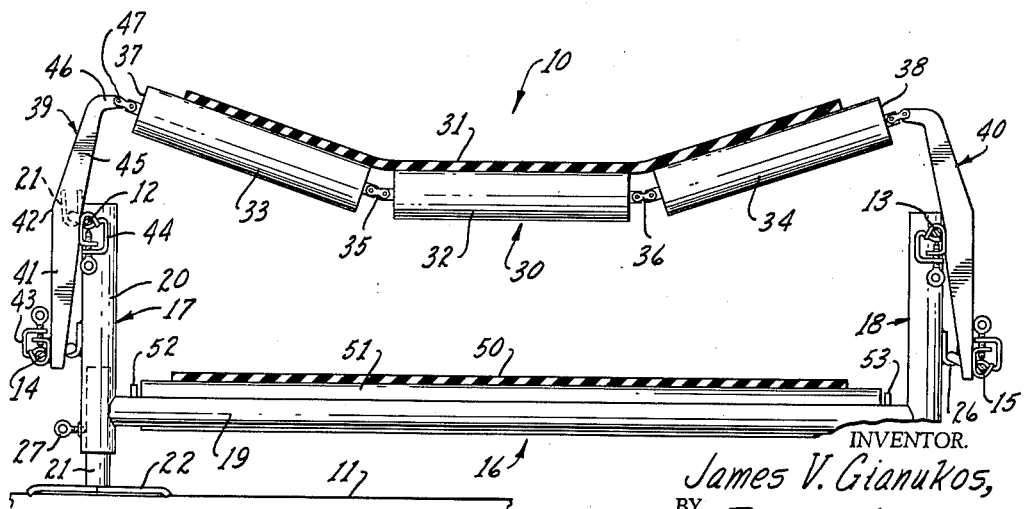
FIGURE 2 is a sectional view of a conveyor embodying the principles of the present invention.

A rope sideframe conveyor is indicated at 10 in FIGURES 1 and 2 as resting on the floor 11 of a coal mine or the like. The conveyor consists essentially of a pair of upper rope sideframes 12 and 13 positioned above a pair of lower rope sideframes 14 and 15. The ropes of each pair are maintained parallel one to another, and the pairs are maintained parallel to one another, by suitable supporting structure, indicated at 16. In this instance, the supporting structure comprises a pair of vertically adjustable support stands 17 and 18 which are maintained a substantially fixed distance apart by any suitable means, such as across brace or strut 19. Each stand consists of outer and inner telescoping members 20 and 21, the inner member 21 in this instance being shown as welded to a foot plate 22 resting on the floor 11. Two pairs of U-shaped saddle members 23, 24, and 25, 26, are welded to the upper telescoping members 20 and receive the flexible strands 12, 13, 14 and 14 therein. Any suitable adjusting means 27 may be utilized to vertically adjust the height of the outer telescoping member to thereby maintain corresponding seats in the pairs of U-shaped strand-receiving saddle members in the same horizontal plane. Although ground engaging support strands have been shown and described, other structure capable of maintaining the strands parallel one to another may be used without departing from the scope of the invention.

A troughing roller assembly 30 which supports the conveying reach 31 of a flexible conveyor belt is suspended from the strands. The troughing roller assembly in this instance consists of a center primary load carrying roller 32 flanked by a pair of end or wing rollers, 33, 34. The rollers are interconnected for flexing movement with respect to one another in a generally vertical plane by chain links 35, 36 which are pivotally connected to the opposing ends of the roller shafts. Although rollers rotating about dead shafts have been illustrated, it will be understood that rollers of various sizes utilizing dead or live shifts may be utilized. It will be noted that the illustrated construction enables the rollers to flex in a plane which is substantially transverse to the center or longitudinal axis of the conveyor.

The end portions 37, 38 of the troughing roller assembly 30 are connected to a pair of upwardly extending elongated bracket assemblies indicated generally at 39 and 40. Bracket assembly 39, which for purposes of description may be taken to be substantially identical to bracket assembly 40, comprises an elongated substantially rigid arm or bracket member 41 which is slightly inwardly curved as at 42. Means for connecting the troughing idler assembly, including the bracket assembly, to the rope sideframes are indicated generally at 43. In this instance, a rope clamp is shown welded to the lower outer side of the elongated bracket member 41, and a similar clamp 44 is secured to the inside of the bracket member near its mid portion. The ropes 12 and 14 are received in clamps 44, 43, respectively. Elongated bracket member 41 includes an upwardly, slightly inwardly extending portion 45 which terminates in a transversly inwardly directed tip 46. Tip 46 in turn is connected to the end portions of the troughing roller assembly by link 47. Tip 46 prevents the lower outer edge of wing roller 33 from striking the arm member and insures full flexing movement of the roller assembly about the bracket assembly.

The return reach 50 of the conveyor belt is supported by a return roller 51 which in turn is connected to the cross brace 19 by members 52 and 53. Since the return roller assembly does not form an essential part of the invention, it is not further illustrated or described.

It will be noted that each of the pairs of ropes are parallel, one to another, and each rope of each pair is parallel to its mate. As will be evident from FIGURE 1, however, the rope sideframes are not truly parallel one to another at all points along the conveyor due to the outward bulging or bowing of the lower rope caused by the placement of the lower clamps 43 on the outside of the elongated bracket members. However, when the spacing of the ropes is considered in relation to the points of connection of their ends to supporting structure, the ropes can be considered to be parallel.

Furthermore, although an elongated, relatively straight bracket member 41 has been illustrated, it will be understood that such a configuration is not essential to the invention. It is only necessary that the bracket member maintain the sets of strands a substantially fixed distance apart vertically, although it is desirable that the effective points of connection of the strands to the bracket members lie on the inside and outside of the members as shown. With this particular arrangement, good mechanical leverage is provided for forcing the lower strands outwardly.

The use and operation of the invention is as follows:

When a load carried by the conveying reach 31 of the belt reaches troughing roller assembly 30, the rollers will curl or trough about the load because the end portions 37, 38 of the roller assembly are free to flex or more inwardly towards one another in a direction generally transverse to the axis or center of the conveyor. The upper pair of ropes 12 and 13 will likewise move inwardly and at the same time the lower pair of ropes 14 and 15 will move outwardly because elongated bracket members 41 act as levers. Since bracket members 41 are rigid, load on the conveyor belt is thereby transmitted to the lower as well as the upper pair of ropes. Under normal load conditions, the movements of the ropes in either pair of ropes will be substantially the same. Variations may occur due to off-center loading on the belt or, perhaps, to misalignment of the bracket assemblies, but in the main the behavior of each bracket assembly will be as described above.

The amount of inward deflection of the end portions of the troughing roller assemblies 30 are illustrated in FIGURES 3, 4, 5 and 6.

Figure 3:
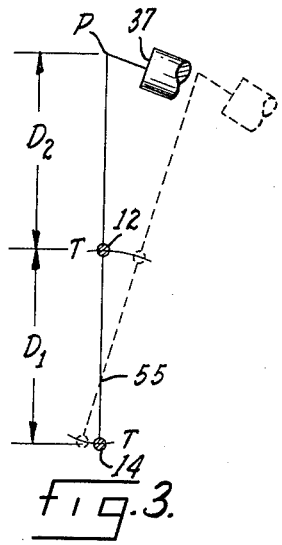
FIGURES 3, 4 and 5 are diagrammatic representations of the inward deflections of the troughing roller assembly in conveyor systems utilizing varying upper rope sideframe tensions.
Figure 4:
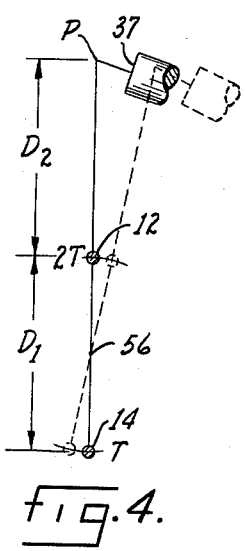
Figure 5:
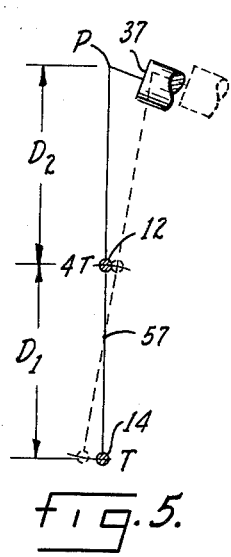

In FIGURES 3, 4 and 5, the effects of a constant load on the same structure with varying rope sideframe tensions are illustrated. In FIGURE 3, for example, the distance between upper and lower ropes 12 and 14 is indicated at D1, and the distance between upper rope 12 and the point of connection P of bracket member 41 to troughing roller assembly 30 as D2. For the sake of convenience, D1 has been shown as substantially equal to D2.

In FIGURE 3, the magnitude of the tension in each of ropes 12 and 14 is indicated diagrammatically as T.

The same physical arrangement of parts is illustrated in FIGURES 4 and 5. In FIGURE 4, however, the tension in upper rope 12 is 2T, or twice as much as that in lower rope 14, and in FIGURE 5 the tension in upper rope 12 is 4T, or four times as much as that in lower rope 14.

By comparing the dotted line positions of the troughing idler assembly 30 with the normal solid line positions in each figure, it can be seen that increasing the tension in the upper rope decreases the inward deflection of the troughing roller assembly. This feature is especially useful in low clearance operations, or along sections of a lengthy conveyor in which troughing must be restricted for some reason. For example, if it is desired to clear machinery, the tension in the upper rope can be increased over that length of rope sideframe that spans the machinery, and then a lesser tension may be used on either side of the obstruction.

It will also be noted that the effective pivot of elongated bracket member 41 varies with tension. In FIGURE 3, the pivot point is rather close to the bottom rope 14 and is indicated at 55. In FIGURE 4, the effective pivot point 56 has moved upwardly slightly, and in FIGURE 5 the effective pivot point 57 is substantially closer to the upper rope than the lower rope. The pivot point in effect floats along the lower portion of the bracket member between the upper and lower ropes.

Figure 6:
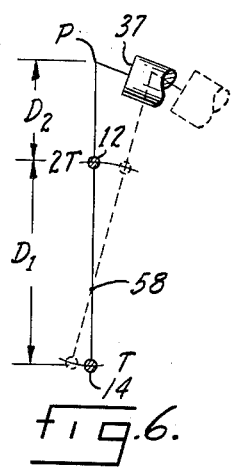
FIGURE 6 is a diagrammatic representation similar to FIGURES 3, 4 and 5 in which the relative positions of the various parts have been altered.

In FIGURE 6, the tension in the upper rope 12 is twice that in lower rope 14, as in FIGURE 4, but the distance between the upper rope 12 and the point of connection P of the end portion 37 of the troughing roller assembly 30 to the upper portion 45 of bracket member 39 is just half of what it was in FIGURE 4. As a result, D1 equals 2D2 in this instance. The deflection of troughing roller assembly 30 is slightly less than that obtained with the construction of FIGURE 4. In other words, by decreasing the lever arm between the upper rope and the point of connection of the troughing roller assembly to the bracket member, the inward deflection of the assembly is decreased for any given tension in the ropes. Thus it can readily be seen that the troughing of the conveying roller assembly 30 can be regulated not only by varying the relative tension between the upper and lower ropes in each set, but also by varying the spacing of the troughing roller assembly from the upper rope.

It should also be noted that if the roller assembly is connected between ropes, an inward pull on the ropes by the assembly will tend to pull both ropes inwardly, whereas connecting the roller assembly above the upper rope causes the lower rope to swing outwardly. These effects can readily be proved by summing moments about any given point in the system utilizing well known principles of statics.

It should also be noted that although a fully flexible troughing roller assembly has been illustrated, the inventive concept is not confined to such a roller assembly. Semi-cradled roller assemblies could just as easily be employed and to some extent, the use of cradled idler assemblies may be feasible. A fully flexible assembly has been chosen for purposes of illustration, however, since it provides the greatest inward movement of the end portions of the troughing roller assembly toward one another in response to load.

It will thus be seen that a multiple rope sideframe conveyor particularly useful in low clearance operations has been provided. The conveyor retains the full flexibility feature of the sausage roller assembly, yet the amount of flexing can be varied at will by varying either the rope tensions or the points of connection of the roller assembly to the bracket assemblies 39, 40, or both. The additional ropes also reduce stresses in the system resulting from shock loading since the impact is distributed over four ropes by the bracket members.

A very important feature of the invention is the fact that the conveyor can be installed on relatively soft ground. Since the tension in each rope is somewhat less than that in a two-rope conveyor, the anchoring support structure need not be quite as solid or heavy as in the conventional construction.

Likewise, the configuration of the upper ends of bracket members 41 insures that the belt will pass over the roller assembly supporting structure should it become detrained rather than bump against it. This eliminates one possible cause of roller assembly misalignment. The bracket members likewise elevate the troughing roller assembly above the ropes so that maintenance and replacement is relatively easy. In this connection it should also be noted that the relatively low tension in the strands makes it somewhat easier to install these assemblies than in many present conveyors.

In addition, the multiple rope arrangement provides a degree of stability to the assembly not possible in some two rope systems, even though the troughing roller assembly is elevated a substantial distance above the uppermost pair of ropes.

Finally, it is possible with this arrangement to utilize considerably lighter troughing roller assembly supporting structures, in this instance stands. Since the tensions in the ropes are somewhat less than in a conventional two rope conveyor, the bending moments in the stands are somewhat less. As a result, the stands may be made lighter in weight and are, of course, more easily handled.

The above description is intended to be illustrative only and not definitive. Accordingly, the scope of the invention should only be limited by the scope of the following appended claims.

I claim:

1. A rope sideframe conveyor including, in combination, a first and a second pair of ropes, said pairs extending in generally parallel relationship along a conveying course, said first pair of ropes overlying the second pair and being spaced generally upwardly therefrom to thereby form two sets of ropes, each set including an upper and a lower rope, supporting structure for maintaining the ropes in each pair of ropes in transversely spaced, generally parallel relationship one to another along the conveying course, a plurality of troughing idler assemblies adapted to support the conveying reach of a flexible conveyor belt, means for supporting the return reach of the conveyor belt, and means for transmitting load on the troughing idler assemblies into the pairs of ropes whereby each pair carries at least a portion of the load, said load transmitting means including a pair of connecting members, one of said pair of connecting members being secured to one of said sets of ropes and the other of said pair of connecting members being secured to the other of said sets of ropes, each connecting member in each pair of connecting members being connected to an adjacent end portion of a troughing roller assembly, each of said connecting members being freely movable through at least a limited range of flexure in a generally vertical plane which is substantially transverse to the conveying course to thereby enable transversely inward deflection of the upper ropes in said sets to be translated, through the connecting members, into an outward deflection of the lower ropes in said sets.

2. The rope sideframe conveyor of claim 1 further characterized in that the troughing idler assembly is secured to the connecting members above the points of securement of the upper ropes to said connecting members.

3. The rope sideframe conveyor of claim 2 further characterized in that each connecting member is effectively secured to the outside of the upper rope and to the inside of the lower rope, in each set of ropes.

4. The rope sideframe conveyor of claim 1 further characterized in that the end portions of the troughing idler assembly are relatively free to move toward and away from one another in a direction substantially transverse to the conveying course.

5. A troughing idler assembly for a multiple rope sideframe conveyor, said troughing idler assembly including, in combination, a roller assembly having a plurality of interconnected belt supporting rollers, and means for suspending said roller assembly from a set of rope sideframes on each side of the conveyor, each of said sets including an upper and a lower rope, said suspending means including a pair of elongated roller assembly supporting members, means for connecting each elongated member to an associated set of rope sideframes at vertically spaced locations on said each elongated member, one rope sideframe in each set of rope sideframes being secured to the inside of an associated elongated connecting member, the other rope sideframe in each set of rope sideframes being secured to the outside of an associated elongated connecting member, and means for connecting the roller assembly to the elongated members at points above the uppermost rope.

6. The troughing idler assembly of claim 5 further characterized in that the troughing idler assembly includes means for effectively connecting each elongated roller assembly supporting member to the outside of an upper rope and to the inside of an associated lower rope whereby inward movement of the upper rope induces an opposite outward movement of the lower rope.

7. The troughing idler assembly of claim 6 further characterized in that the upper end of each elongated roller assembly supporting member is adapted for connection to the roller assembly.

8. A bracket assembly for connecting a troughing roller assembly to the rope sideframes of a multiple rope sideframe conveyor, said bracket assembly including an elongated substantially rigid member whose length is longer than the distance between the uppermost and lowermost rope sideframes in a set of rope sideframes forming one side of a rope sideframe conveyor, means for effectively connecting the uppermost rope sideframe to the inside of the elongated member and the lowermost rope to the outside of the elongated member whereby inward movement of the uppermost rope sideframe induces an opposite outward movement of the lowermost rope sideframe and means for connecting the upper portion of said elongated member to the end of a troughing roller assembly.

9. The bracket assembly of claim 8 wherein the upper portion of the elongated member terminates in a generally inwardly directed portion adapted for connection to the end portion of a troughing roller assembly to thereby enable a belt carried by the roller assembly to pass outwardly over the elongated member.

References Cited in the file of this patent

UNITED STATES PATENTS 2,904,166    Stinson _____ Sept. 15, 1959

FOREIGN PATENTS 535,658    Italy _____ Nov. 16, 1955